(12) United States Patent
Kambara et al.

(10) Patent No.: US 9,919,270 B2
(45) Date of Patent: Mar. 20, 2018

(54) NON-CATALYTIC DENITRATION DEVICE AND NON-CATALYTIC DENITRATION METHOD

(71) Applicants: GIFU UNIVERSITY, Gifu (JP); SAWAFUJI ELECTRIC CO., LTD., Gunma (JP); ACTREE CORPORATION, Ishikawa (JP)

(72) Inventors: Shinji Kambara, Gifu (JP); Tomonori Miura, Gunma (JP); Tatsuya Ikeda, Gunma (JP); Sho Arai, Gunma (JP); Megumi Masui, Ishikawa (JP)

(73) Assignees: GIFU UNIVERSITY, Gifu (JP); SAWAFUJI ELECTRIC CO., LTD., Gunma (JP); ACTREE CORPORATION, Ishikawa (JP)

(*) Notice: Subject to any disclaimer, the term of this patent is extended or adjusted under 35 U.S.C. 154(b) by 3 days.

(21) Appl. No.: 15/034,386

(22) PCT Filed: Oct. 30, 2014

(86) PCT No.: PCT/JP2014/078877
§ 371 (c)(1),
(2) Date: May 4, 2016

(87) PCT Pub. No.: WO2015/068634
PCT Pub. Date: May 14, 2015

(65) Prior Publication Data
US 2016/0279570 A1    Sep. 29, 2016

(30) Foreign Application Priority Data

Nov. 11, 2013 (JP) ................................. 2013-232870

(51) Int. Cl.
*B01D 53/92* (2006.01)
*B01D 53/79* (2006.01)
(Continued)

(52) U.S. Cl.
CPC ............. *B01D 53/92* (2013.01); *B01D 53/56* (2013.01); *B01D 53/76* (2013.01); *B01D 53/79* (2013.01);
(Continued)

(58) Field of Classification Search
None
See application file for complete search history.

(56) References Cited

U.S. PATENT DOCUMENTS

| | | | | |
|---|---|---|---|---|
| 5,658,547 A | * | 8/1997 | Michalak | ............. B01D 53/501 110/345 |
| 2002/0179493 A1 | * | 12/2002 | Etter | ...................... C10B 55/00 208/131 |
| 2010/0281851 A1 | * | 11/2010 | Roach | ................... F01N 3/2066 60/274 |

FOREIGN PATENT DOCUMENTS

| | | | |
|---|---|---|---|
| BE | 842229 | * | 9/1976 |
| JP | 52130473 | | 11/1977 |

(Continued)

OTHER PUBLICATIONS

Shinji Kanbara et al., "Pulse Plasma ni yoru Suiso Carrier kara no Mushokubai Suiso Seizo", the Japan Society of Mechanical Engineers, Proceedings of Thermal Engineering Conference, Nov. 16, 2012 (Nov. 16, 2012), vol. 2012, pp. 439 to 440.
(Continued)

*Primary Examiner* — Sheng H Davis
(74) *Attorney, Agent, or Firm* — Trego, Hines & Ladenheim, PLLC; Brandon Trego; Jonathan Hines

(57) ABSTRACT

A denitration device and a denitration method in which denitration is performed efficiently and in a stable manner in a lower-reaction-temperature region without using a catalyst. The denitration device is provided with a combustion chamber, a denitration agent feed means for feeding a denitration agent into the combustion chamber, an exhaust
(Continued)

pipe, and an OH-radical-generating substance feed means for feeding an OH radical-generating substance into the exhaust pipe. The denitration agent feed means feeds a denitration agent into the exhaust gas of the combustion chamber to perform a first denitration reaction step, and the OH-radical-generating substance feed means feeds the OH-radical-generating substance into the exhaust gas in the exhaust pipe to perform a second denitration reaction step.

4 Claims, 10 Drawing Sheets

(51) Int. Cl.
  *B01D 53/76*    (2006.01)
  *B01D 53/56*    (2006.01)
  *F23J 7/00*     (2006.01)
  *F23G 7/06*     (2006.01)
  *F23J 15/00*    (2006.01)

(52) U.S. Cl.
  CPC   *F23G 7/06* (2013.01); *F23J 7/00* (2013.01); *F23J 15/003* (2013.01); *B01D 2251/106* (2013.01); *B01D 2251/202* (2013.01); *B01D 2251/208* (2013.01); *B01D 2251/2062* (2013.01); *B01D 2251/2067* (2013.01); *B01D 2252/103* (2013.01); *B01D 2258/0291* (2013.01); *F23J 2215/10* (2013.01); *F23J 2219/20* (2013.01)

(56) References Cited

FOREIGN PATENT DOCUMENTS

| | | |
|---|---|---|
| JP | 53083971 | 7/1978 |
| JP | 53144457 | 12/1978 |
| JP | 53146262 | 12/1978 |
| JP | 53146968 | 12/1978 |
| JP | 5456976 | 5/1979 |
| JP | 6328430 | 2/1988 |
| JP | 1127028 | 5/1989 |

OTHER PUBLICATIONS

Japan Patent Office, International Search report for PCT/JP2014/078877, dated Feb. 3, 2015, Tokyo.

\* cited by examiner

NON-CATALYTIC DENITRATION DEVICE AND NON-CATALYTIC DENITRATION METHOD

TECHNICAL FIELD

The present invention relates to a non-catalytic denitration device and a non-catalytic denitration method for removing nitrogen oxides, and specifically to a non-catalytic denitration device and a non-catalytic denitration method for efficiently and stably removing nitrogen oxides by feeding a denitration agent and an OH-radical-generating substance to exhaust gas.

BACKGROUND ART

Nitrogen oxides (hereinafter may be referred to as NOx) contained in exhaust gas from, for example, waste incinerators, engines, and electrical generators are atmosphere pollutants, so that their emission is strictly regulated. Therefore, the reduction of the concentration of nitrogen oxides contained in exhaust gas by providing a denitration means in an incineration facility or an internal combustion engine is becoming an essential technique.

In order to treat exhaust gas containing nitrogen oxides, a selective catalyst reduction method (referred to as the SCR method) using ammonia and a catalyst is commercially used. The SCR method is a technique of blowing ammonia into the exhaust gas at a temperature of about 400° C., and reducing nitrogen oxides into nitrogen and water on a catalyst. The denitration rate by the method is as high as 80% or more, and in Japan the method is mainly used in large burning facilities such as thermal power generation. In addition, the SCR method is also currently used in middle- and small-scale combustion furnaces where the concentration of nitrogen oxides is strictly regulated. However, the ordinary SCR method uses a costly catalyst, so that the whole facility is very costly. Furthermore, because of the life and abrasion of the catalyst itself, replenishment and replacement during use are necessary. Major shortcomings of the SCR method are the high costs of the initial investment and operation management for the catalyst. In a burning facility where the cost for environmental measures cannot be sufficiently secured, commercialization of a non-catalytic denitration method (referred to as the SNCR method) using no catalyst is strongly desired.

Patent Literature 1 discloses a basic structure of a non-catalytic denitration method. The non-catalytic denitration method disclosed in Patent Literature 1 is a method including injecting ammonia or ammonia generated from a substance generating ammonia (for example, urea) into a combustion furnace at a high temperature (800° C. to 1100° C.), wherein nitric monoxide (NO) is reduced to water and nitrogen according to the reaction formula:

$$4NO+4NH_3+O_2 \rightarrow 4N_2+6H_2O \quad \text{(Formula 1)}$$

FIG. 11 shows the result of validation of denitration characteristics of a prior art non-catalytic denitration method. The denitration reaction occurs in the temperature range from 800° C. to 1100° C. (hereinafter may be referred to as TW), and the temperature condition is particularly preferably about 900° C. In FIG. 11, the denitration rate used as the index of denitration properties is the rate of NO reduction, and defined by the following formula:

$$(NO_0-NO_1)/NO_0 \times 100[\%] \quad \text{(Formula 2)}$$

wherein $NO_0$ is the concentration (ppm, dry) of nitric monoxide contained in the burning exhaust gas, and $NO_1$ is the concentration (ppm, dry) of nitric monoxide after denitration.

When the non-catalytic denitration method is used in an actual combustion furnace, on the basis of the above-described disclosure, ammonia is blown into the region where the exhaust gas temperature becomes 900° C. However, there are problems that the actual denitration rate by the non-catalytic denitration method is as low as about 30%, and the efficiency of denitration is lower than that by the SCR method, because the exhaust gas temperature in the combustion furnace is unstable and difficult to be kept at 900° C., and the retention time of exhaust gas at 900° C. is often shorter than 0.3 seconds in the combustion furnace and exhaust channel communicated therewith. Therefore, many researches are being conducted for carrying out denitration at a lower temperature with a higher efficiency.

Patent Literature 2 discloses a technique for expanding TW to the low temperature side by a method blowing hydrogen peroxide. Patent Literature 3 discloses a technique for expanding TW to the low temperature side by a method using an electron beam. Patent Literature 4 discloses a technique for expanding TW to the low temperature side by a method using corona discharge. Patent Literature 5 discloses a technique for expanding TW to the low temperature side by a method using pulse discharge. As a method having advantages over prior art in terms of the cost and performance, the inventors developed a device and a method for blowing ammonia modified by plasma, and disclosed the techniques in Patent Literatures 6 and 7.

However, it is pointed out that the denitration rate by the prior art SNCR method is still as low as about 60%. In addition, it has been pointed out that the increase of ammonia to be injected for the purpose of improving the denitration rate can cause the discharge of unreacted ammonia into the air. Therefore, demanded is a technique for stably carrying out denitration in a lower reaction temperature range with a higher efficiency.

CITATIONS LIST

Patent Literature

Patent Literature 1: U.S. Pat. No. 3,900,554
Patent Literature 2: Japanese Patent No. 3558737
Patent Literature 3: Japanese Patent No. 3361200
Patent Literature 4: Japanese Unexamined Patent Application Publication No. 10-235137
Patent Literature 5: Japanese Unexamined Patent Application Publication No. 10-118448
Patent Literature 6: Japanese Patent No. 3826085
Patent Literature 7: Japanese Patent No. 4096068

SUMMARY OF INVENTION

Technical Problem

The present invention has been made in view of the above-described circumstances, and is intended to provide a non-catalytic denitration device and a non-catalytic denitration method which can remove nitrogen oxides contained in exhaust gas at a high ratio without catalyst, and to provide a non-catalytic denitration device and a non-catalytic denitration method which allows stable operation and can be used in a continuously operated incinerator and an internal combustion engine.

Solutions to Problem

The invention according to claim 1 relates to a non-catalytic denitration device for removing nitrogen oxides. The non-catalytic denitration device of claim 1 includes a combustion chamber for denitrating exhaust gas, an exhaust pipe provided between the combustion chamber and an exhaust port, a denitration agent feed means for feeding a denitration agent to the combustion chamber, and an OH-radical-generating substance feed means for feeding an OH-radical-generating substance to the exhaust pipe.

The non-catalytic denitration device of the present invention carries out denitration in a combustion chamber by a denitration agent, and feeds an OH-radical-generating substance to an exhaust pipe, thereby allowing further progress of denitration in the exhaust pipe by the synergistic effect of the denitration agent and OH-radicals.

The non-catalytic denitration device of claim 2 is characterized by that a denitration agent is fed to exhaust gas at 800° C. or higher in the combustion chamber by a denitration agent feed means, and an OH-radical-generating substance is fed by an OH-radical-generating substance feed means to the exhaust gas at 500° C. or higher and 800° C. or lower in an exhaust pipe.

As a result of dedicated research, the inventors found that marked synergistic effect of a denitration agent and an OH radical is achieved by feeding a denitration agent to exhaust gas at 800° C. or higher for denitration, and further adding an OH-radical-generating substance to the exhaust gas at 500° C. or higher and 800° C. or lower. The inventors validated this finding, and have accomplished the present invention.

The non-catalytic denitration device of claim 3 is characterized by that the OH-radical-generating substance feed means includes a hydrogen feed means and a hydrogen feed amount control means, whereby hydrogen as an OH-radical-generating substance is fed to the exhaust pipe.

The non-catalytic denitration device of claim 4 is characterized by that the denitration agent feed means feeds ammonia or urea as a denitration agent. Furthermore, the denitration device of claim 4 is characterized by that the hydrogen feed means generates hydrogen from the ammonia or urea fed from the denitration agent feed means, and feeds it.

The hydrogen feed means of the non-catalytic denitration device of claim 5 is characterized by that it includes the following structure for generating hydrogen from ammonia or urea, and feeding it. The hydrogen feed means of the present invention includes a plasma reactor, a high voltage electrode connected to a high voltage power source in a state placed inside of the plasma reactor, and a grounding electrode placed outside the plasma reactor so as to oppose the high voltage electrode. The hydrogen feed means of the present invention discharges between the high voltage electrode and grounding electrode by the electric power fed from the high voltage power source when the ammonia- or urea-containing gas fed from the denitration agent feed means is introduced to the plasma reactor, and turns the ammonia or urea contained in the gas to plasma, thereby generating hydrogen. The generated hydrogen is introduced to the exhaust pipe.

The present invention also provides a non-catalytic denitration method for removing nitrogen oxides from exhaust gas. The non-catalytic denitration method of claim 6 includes a first denitration reaction step for carrying out first denitration reaction by feeding a denitration agent to the exhaust gas at 800° C. or higher, and a second denitration reaction step for carrying out second denitration reaction by feeding an OH-radical-generating substance to the exhaust gas at 500° C. or higher and 800° C. or lower after the first denitration reaction.

The denitration method of claim 7 is characterized by that the supply amount of the hydrogen gas fed in the second denitration reaction step is controlled by the temperature of the first denitration reaction step, the temperature of the second denitration reaction step, and the concentration of the nitrogen oxides contained in the exhaust gas.

The invention of claim 8 relates to another non-catalytic denitration device. The non-catalytic denitration device of the present invention is a denitration device for removing nitrogen oxides in exhaust gas, and includes a combustion chamber, an exhaust pipe provided between the combustion chamber and an exhaust port, a denitration agent feed means for feeding a denitration agent, an OH-radical-generating substance feed means for feeding an OH-radical-generating substance, a denitration agent blowing port communicated with the denitration agent feed means on the upstream side of the exhaust pipe, and an OH-radical-generating substance blowing port communicated with the OH-radical-generating substance feed means on the downstream side of the exhaust pipe.

Advantageous Effects of Invention

The non-catalytic denitration device and non-catalytic denitration method according to the present invention allow efficient denitration of exhaust gas without using a catalyst.

The non-catalytic denitration device and non-catalytic denitration method according to the present invention allows denitration of exhaust gas at a significantly higher efficiency than the prior art denitration device and denitration method based on the SNCR method. The denitration rate by the prior art non-catalytic denitration device and non-catalytic denitration method based on the SNCR method is about 10 to 60%, while the non-catalytic denitration device and non-catalytic denitration method of the present invention can achieve a denitration rate of 98% ultimately.

Using the prior art denitration device and denitration method based on the SNCR method, the denitration step is carried out at a temperature of 800° C. or higher, while the non-catalytic denitration device and non-catalytic denitration method according to the present invention allow carrying out the denitration step at 500° C. or higher. Therefore, the control of the operating conditions is easier than prior art, and highly efficient denitration can be achieved stably.

In the present invention, the means for feeding hydrogen as an OH-radical-generating substance allows generation of hydrogen without using a catalyst. As a result of this, construction of a device and denitration are carried out at lower costs than prior art.

In particular, the use of the hydrogen feed means of the present invention, which generates hydrogen from a denitration agent and feeds it, eliminates the necessity of cumbersome storage of hydrogen in a cylinder or the like, and thus allows simplification of the whole device.

According to the non-catalytic denitration method of the present invention, the optimum concentration of the hydrogen gas fed in the second denitration reaction step can be determined by the temperature of the first denitration reaction step, the temperature of the second denitration reaction step, and the concentration of the nitrogen oxides contained in the exhaust gas, whereby a denitration method which can stably and constantly maintain a high denitration rate is provided.

The non-catalytic denitration device according to the present invention introduces a denitration agent to the upstream side, and introduces an OH-radical-generating substance to the downstream side, thereby allowing denitration of exhaust gas at a significantly higher efficiency than a denitration device based on prior art SNCR method.

DESCRIPTION OF EMBODIMENTS

Preferred embodiments of the non-catalytic denitration device and non-catalytic denitration method according to the present invention are described below with reference to drawings.

First Embodiment

Figure 1:
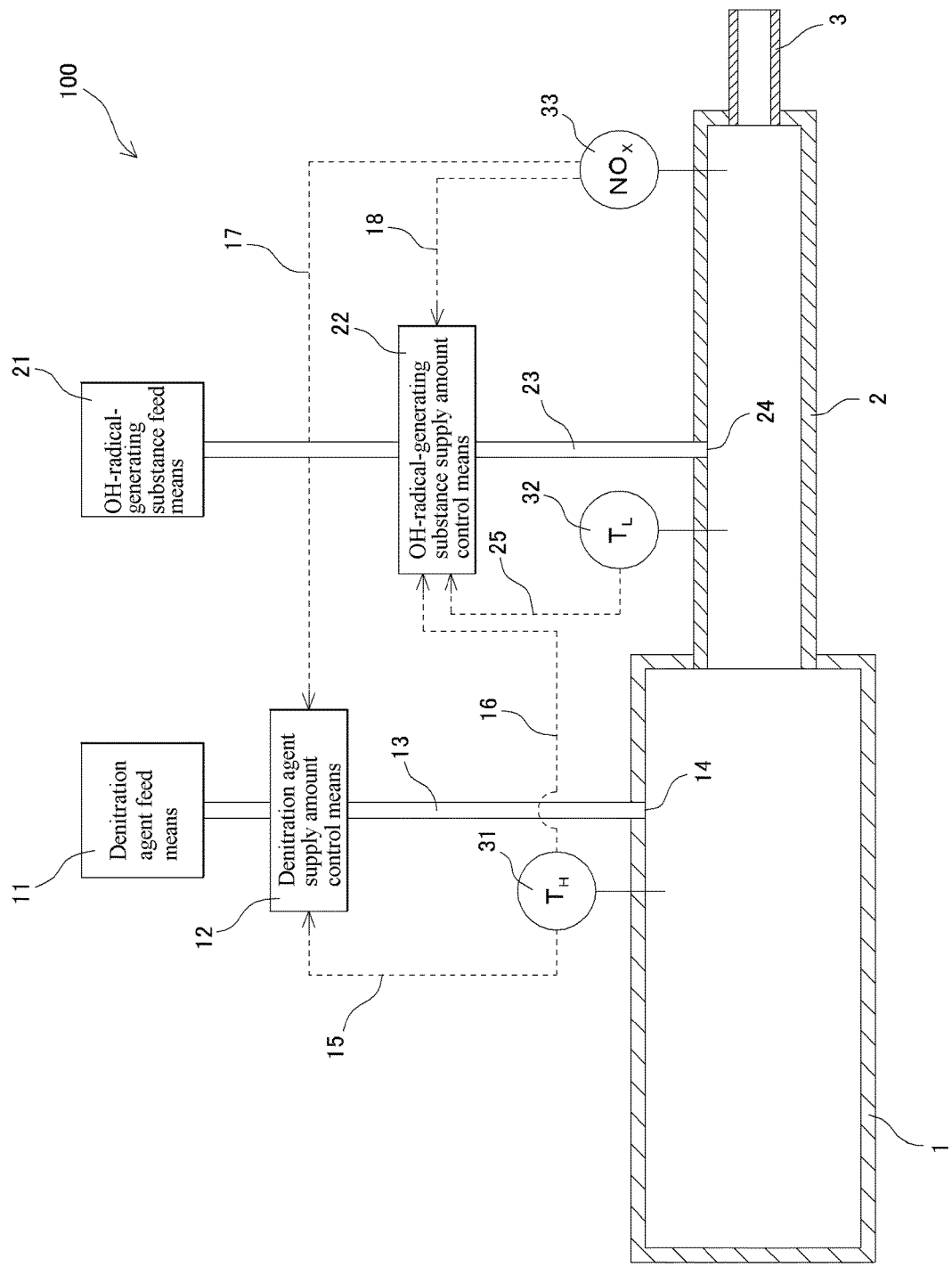
FIG. 1 is a block diagram schematically showing the structure of a denitration device 100 according to a first embodiment.

FIG. 1 is a block diagram schematically showing the structure of a denitration device 100 according to a first embodiment of the present invention. The denitration device 100 of the present embodiment includes a combustion chamber 1 for denitrating exhaust gas, an exhaust pipe 2 provided between the combustion chamber 1 and an exhaust port 3, a denitration agent feed means 11 for feeding a denitration agent to the combustion chamber 1, and an OH-radical-generating substance feed means 21 for feeding an OH-radical-generating substance to the exhaust pipe 2.

The combustion chamber 1 is a component of a denitration device, and corresponds to a furnace body of an incinerator, and to a cylinder of an internal combustion engine. Within the combustion chamber, a fuel, waste, and other combustible substances are burned, and high temperature exhaust gas at 800° C. or higher is generated. In the combustion chamber 1, a denitration agent blowing port 14 is opened. A denitration agent feed channel 13 is provided between the denitration agent feed means 11 and denitration agent blowing port 14, and the combustion chamber 1 and denitration agent feed means 11 are communicated. A denitration agent supply amount control means 12 is provided on the denitration agent feed channel 13.

The exhaust pipe 2 is provided in the channel through which high temperature exhaust gas is discharged from the combustion chamber, at the position downstream of the combustion chamber 1, and upstream of the exhaust port 3. The exhaust pipe 2 is a component of the denitration device corresponding to the flue of an incinerator. The exhaust pipe 2 of the present embodiment is composed so as to have a smaller sectional area than that of the combustion chamber 1, thereby allowing smooth movement and discharge of the exhaust gas whose volume is decreased by cooling. An OH-radical-generating substance blowing port 24 is opened in the exhaust pipe 2. An OH-radical-generating substance feed channel 23 is provided between the OH-radical-generating substance feed means 21 and OH-radical-generating substance blowing port 24, and the exhaust pipe 2 is communicated with the OH-radical-generating substance feed means 21. An OH-radical-generating substance supply amount control means 22 is provided on the OH-radical-generating substance feed channel 23.

A temperature measurement means 31 is provided in the combustion chamber 1, and the temperature $T_H$ measured herein is transmitted to the denitration agent supply amount control means 12 through a communication line 15, and used as a factor determining the feed amount of the denitration agent. The temperature measurement means 31 can also communicate with the OH-radical-generating substance supply amount control means 22 through a communication line 16, and the temperature $T_H$ is simultaneously transmitted to the OH-radical-generating substance supply amount control means 22, and used as a factor determining the feed amount of the OH-radical-generating substance. A temperature measurement means 32 is provided in the exhaust pipe 2, and the temperature $T_L$ measured herein is transmitted to the OH-radical-generating substance supply amount control means 22 through a communication line 25, and used as a factor determining the feed amount of the OH-radical-generating substance. The temperature measurement means 31 and 32 may be, for example, a sensor based on a thermocouple or laser.

A NOx concentration measurement means 33 is arranged in the vicinity of the exhaust port 3, and the measurement result is transmitted to the denitration agent supply amount control means 12 through a communication line 17, and used as another factor for determining and controlling the feed amount of the denitration agent. In the same manner, the results measured by the NOx concentration measurement means 33 is transmitted to the OH-radical-generating substance supply amount control means 22 through a communication line 18, and used as another factor for determining and controlling the feed amount of the OH-radical-generating substance.

The OH-radical supply amount control means 22 includes a computer, which applies the received NOx concentration and temperature to a certain expression, thereby determining the feed amount of the OH-radical-generating substance, and controlling the supply amount of the OH-radical-generating substance by switching the valves. In the same manner, the denitration agent supply amount control means 12 includes a computer, which applies the received NOx concentration and temperature to a certain expression, thereby determining the feed amount of the denitration agent, and controlling the supply amount of the denitration agent by switching the valves.

The denitration agent which can be used in the present embodiment is urea, ammonia, hydrazine, or an ammonium salt. In the combustion chamber 1, the NOx contained in the exhaust gas, and the denitration agent fed from the denitration agent feed means 11 through the denitration agent blowing port 14 causes known chemical reaction $4NO + 4NH_3 + O_2 \rightarrow 4N_2 + 6H_2O$ (Formula 1) under temperature conditions at 800° C. or higher. This is the first denitration reaction step. At this time, if the reaction temperature exceeds 1100° C., the amount of NOx generated in the combustion chamber 1 tends to increase, so that the temperature in the combustion chamber 1 is preferably kept at 800° C. or higher and 1100° C. or lower.

The exhaust gas continuously causing the first denitration reaction moves from the combustion chamber 1 to the exhaust pipe 2. The exhaust gas is slowly cooled during movement, so that its temperature is from 500° C. to 800° C. in the exhaust pipe 2. To the exhaust gas in the exhaust pipe, an OH-radical-generating substance is fed from the OH-radical-generating substance feed means 21. The OH-radical-generating substances which may be used in the present embodiment are hydrogen, hydrogen peroxide, hydrocarbon, and water.

The exhaust gas moved from the combustion chamber 1 to the exhaust pipe 2 contains nitric monoxide, ammonia, and oxygen. The exhaust gas causes the following chemical reaction with the OH radical generated from the OH-radical-generating substance under temperature conditions at 500° C. or higher. This is the second denitration reaction step.

$$NH_3 + OH \rightarrow NH_2 + H_2O \quad \text{(Formula 3)}$$

$$NH_2 + NO \rightarrow N_2 + H_2O \quad \text{(Formula 4)}$$

More specifically, as shown by Formula 3 in the reaction formula, the OH radical reacts with the unreacted ammonia remaining after the first denitration reaction to form an $NH_2$ radical. This $NH_2$ radical reacts with nitric monoxide to reduce the nitric monoxide to harmless $N_2$ and $H_2O$ (Formula 4).

When the reaction temperature is 500° C. or higher, there is almost no temperature dependency in the reaction represented by Formula 4. However, the reaction speed of Formula 3 becomes slower as the temperature decreases. Therefore, when the exhaust gas temperature is low, in order to increase the denitration rate, OH radicals must be excessively fed, thereby increasing the reaction speed of Formula 3. In other words, in the exhaust pipe 2, the lower the temperature of the exhaust gas, the more OH radicals must be fed, and the favorable OH radical feed amount depends on the exhaust gas temperature in the exhaust pipe 2.

The exhaust gas after completion of the second denitration reaction step in the exhaust pipe 2 further moves toward the exhaust port 3, and is discharged. The denitration device 100 of the present embodiment allows the promotion of denitration reaction by blowing an OH-radical-generating substance thereinto, as long as the temperature is 500° C. or higher, which is significantly lower than the temperature conditions assumed in prior art, and thus achieves a higher denitration rate than prior art.

Second Embodiment

Figure 2:
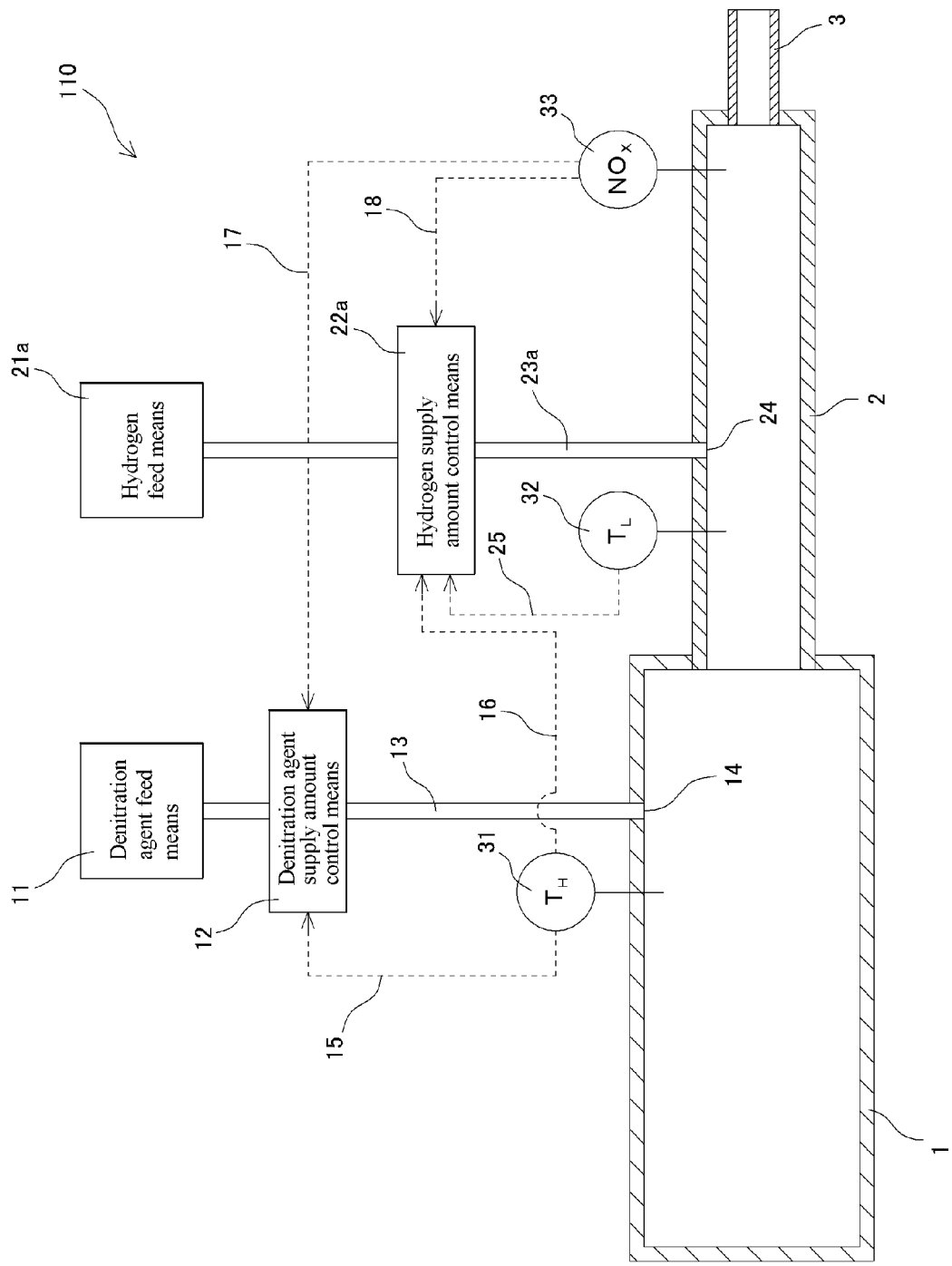
FIG. 2 is a block diagram schematically showing the structure of a denitration device 110 according to a second embodiment.

FIG. 2 is a block diagram schematically showing the structure of a denitration device 110 according to a second embodiment of the present invention. The denitration device 110 of the present embodiment feeds hydrogen as an OH-radical-generating substance. Therefore, the denitration device 110 includes a hydrogen feed means 21a as an OH-radical-generating substance feed means, and a hydrogen supply amount control means 22a as an OH-radical-generating substance supply amount control means. The same components as those in the first embodiment are indicated with the same numerals, and explanations thereof are omitted.

In the exhaust pipe 2, an OH-radical-generating substance blowing port 24 as a hydrogen blowing port is opened. The hydrogen feed means 21a and OH-radical-generating substance blowing port 24 are communicated by a hydrogen feed channel 23a. The hydrogen supply amount control means 22a is provided on the hydrogen feed channel 23a. The hydrogen feed means 21a of the present embodiment may be a commonly known hydrogen generation means such as a hydrogen cylinder, or a hydrogen generation means which generates hydrogen from light oil by steam reforming.

The hydrogen fed to the exhaust pipe generates an OH radical by the following reaction:

$$H_2 + O_2 \rightarrow 2OH \quad \text{(Formula 5)}$$

The reaction speed of Formula 5 which generates OH radicals from hydrogen is scarcely dependent on the temperature under temperature conditions at 500° C. or higher. On the other hand, hydrogen is known to generate NOx when fed to exhaust gas at higher than 800° C. The amount of NOx generated by the reaction between hydrogen and exhaust gas increases with the increase of the temperature, so that the denitration device 110 of the present embodiment allows more preferred improvement of the denitration rate by feeding hydrogen to the exhaust gas at 500° C. or higher and 800° C. or lower introduced to the exhaust pipe 2.

Third Embodiment

Figure 3:
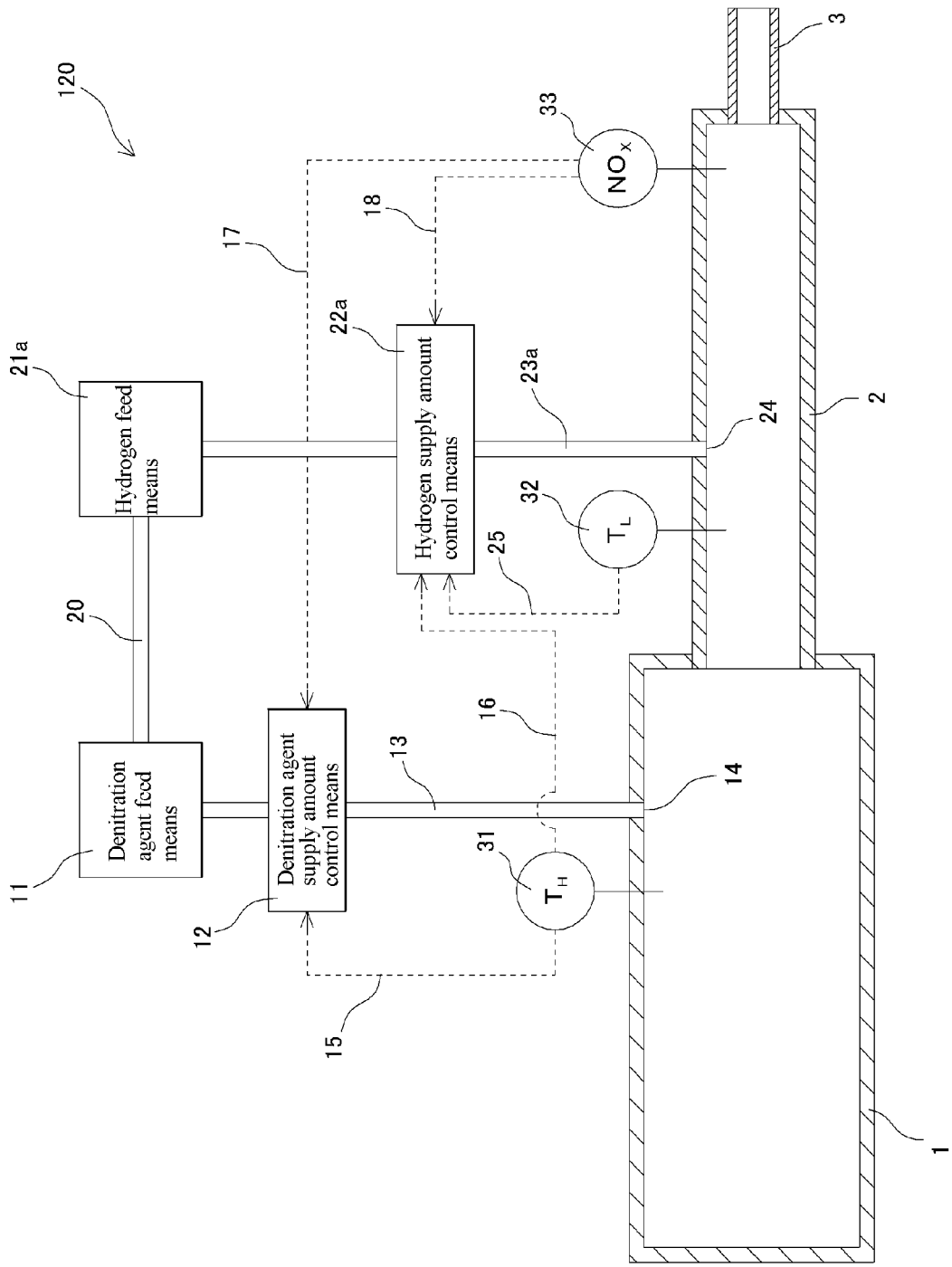
FIG. 3 is a block diagram schematically showing the structure of a denitration device 120 according to a third embodiment.

FIG. 3 is a block diagram schematically showing the structure of a denitration device 120 according to a third embodiment of the present invention. The denitration device 120 of the present embodiment includes a hydrogen raw material feed channel 20 for feeding a denitration agent from a denitration agent feed means 11 to a hydrogen teed means 21a. The denitration agent feed means 11 of the present embodiment is a means for feeding ammonia or urea as a denitration agent. In addition, the hydrogen feed means 21a generates hydrogen by decomposing ammonia or urea fed from the denitration agent feed means 11, and feed the hydrogen to an exhaust pipe 2. The same components as those in the first and second embodiments are indicated with the same numerals, and explanations thereof are omitted.

Figure 4:
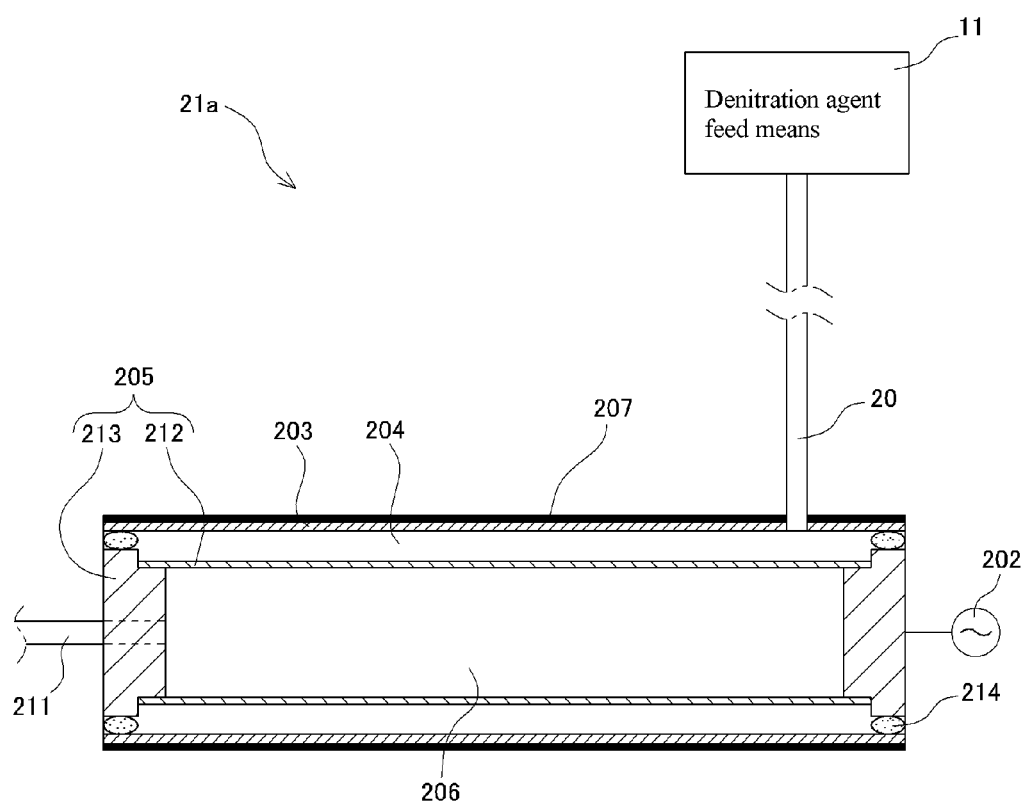
FIG. 4 is a longitudinal cross sectional view schematically showing the structure of a hydrogen feed means included in the denitration device 120 of the third embodiment.

FIG. 4 is a longitudinal cross sectional view schematically showing the structure of a hydrogen feed means 21a which is particularly preferably used in the denitration device 120 of the present embodiment, for generating hydrogen from ammonia or urea. The hydrogen feed means 21a of the present embodiment can generate hydrogen from ammonia or urea using an atmospheric pressure non-equilibrium plasma reactor at normal temperature and under atmospheric pressure.

An aspect of the plasma reactor used as the hydrogen feed means 21a is described below in detail. A plasma reactor 203 is made of quartz, and has a cylindrical form. The plasma reactor 203 contains a high voltage electrode 205 therein. The high voltage electrode 205 includes a cylindrical hydrogen separation membrane 212, and disk-shaped supports 213 for supporting the both ends of the hydrogen separation membrane 212. The high voltage electrode 205 is connected to a high voltage power source 202, and a high voltage is applied thereto. The high voltage power source at this time is preferably a high voltage pulse power source. In the present embodiment, the hydrogen separation membrane 212 is formed of thin film of a palladium alloy. An O-ring 214 is fitted between the plasma reactor 203 and supports 213 in such a manner that the hydrogen separation membrane 212 is concentrically arranged with reference to the inner wall of the plasma reactor 203. As a result of this, a discharge space 204 keeping a fixed interval is formed in the space between the inner wall of the plasma reactor 203 and the hydrogen separation membrane 212. In addition, an inner chamber 206 which is a closed space surrounded by the hydrogen separation membrane 212 and supports 213 is formed inside of the hydrogen separation membrane 212. A grounding electrode 207 is arranged concentrically to the hydrogen separation membrane 212 so as to oppose the hydrogen separation membrane 212 in contact with the outside of the plasma reactor 203. The hydrogen separation membrane 212 and grounding electrode 207 are opposed to each other, and the plasma reactor 203 made of quartz is arranged therebetween, so that the plasma reactor 203 functions as a dielectric, and causes dielectric barrier discharge upon application of a high voltage to the hydrogen separation membrane 212.

The hydrogen raw material feed channel 20 communicates the denitration agent feed means 11 with the discharge space 204, and feeds the gas containing urea or ammonia fed from the denitration agent feed means 11 to the discharge space 204. The denitration agent feed means 11 includes a gas tank for storing a gas fed to the plasma reactor 203, a gas mixing means including a valve such as a motor-driven valve, and a control means for controlling the feed amount while measuring the pressure and composition of the fed gas. The denitration agent feed means 11 can feed 100% ammonia gas, 100% urea gas, or a mixed gas composed of an inert gas such as nitrogen and ammonia or urea.

The high voltage power source 202 is placed outside the plasma reactor 203, and applies a high voltage to the high voltage electrode 205. When a high voltage pulse power source is specifically used in the present embodiment, a high voltage having an extremely short waveform retention time is applied, so that the electron energy density can be increased, and the electric power consumption can be decreased.

In the hydrogen feed means 21a of the present embodiment, the method for generating hydrogen includes the following first to fourth generation steps. In the first generation step, the denitration agent feed means 11 feeds the gas containing ammonia or urea to the discharge space 204 at a predetermined flow rate through the hydrogen raw material feed channel 20. In the second generation step, the application voltage and frequency of the high voltage power source 202 are adjusted based on the gas flow rate. In the third generation step, dielectric barrier discharge is caused between the hydrogen separation membrane 212 and grounding electrode 207 of the high voltage electrode 205 to generate atmospheric pressure non-equilibrium plasma of ammonia or urea in the discharge space 204. In the fourth generation step, the hydrogen gas generated from atmospheric pressure non-equilibrium plasma of ammonia or urea is moved to the inner chamber 206 through the hydrogen separation membrane 212 to separate the hydrogen gas. The hydrogen separation membrane 212 of the present embodiment made of thin film of a palladium alloy usually requires a temperature of 400-500° C. for hydrogen separation. However, in the plasma reactor 203 of the present example, hydrogen separation proceeds at a high electron temperature of about 10000° C. generated by the atmospheric pressure non-equilibrium plasma, so that the hydrogen separation membrane 212 can carry out hydrogen separation without feeding heat at 400-500° C. from outside. In the fourth step, the movement of the hydrogen gas from the discharge space 204 to the inner chamber 206 is carried out by installing a pump (not shown) in the hydrogen channel 211 connected to the inner chamber 206, and making the pressure in the inner chamber 206 negative.

In the atmospheric pressure non-equilibrium plasma of ammonia, the reaction represented by the following formula occurs.

$$NH_3 + e \rightarrow N + H + H_2 + e \qquad \text{(Formula 6)}$$

$$H + H \rightarrow H_2 \qquad \text{(Formula 7)}$$

$$N + N \rightarrow N_2 \qquad \text{(Formula 8)}$$

$$N + 3H \rightarrow NH_3 \qquad \text{(Formula 9)}$$

Formula 6 represents the decomposed state of ammonia turned to plasma, Formula 7 represents the generation of hydrogen by recombination of hydrogen radicals (H), Formula 8 represents the generation of nitrogen by recombination of nitrogen radicals (N), and Formula 9 represents regeneration of ammonia. Under conditions without a hydrogen separation membrane, as represented by Formula 9, ammonia is regenerated at a constant ratio. However, in the present embodiment, since hydrogen generated by the hydrogen separation membrane 212 is quickly introduced to the inner chamber 206 on the inside of the hydrogen separation membrane 212, regeneration of ammonia hardly occurs, and the hydrogen contained in ammonia is finally taken out in the form of 100% hydrogen gas.

The denitration device shown by the present embodiment, which feeds hydrogen generated from ammonia or urea using a plasma reactor, allows providing hydrogen, that is, an OH-radical-generating substance very quickly, and further facilitates the control of denitration conditions.

Fourth Embodiment

Figure 6:
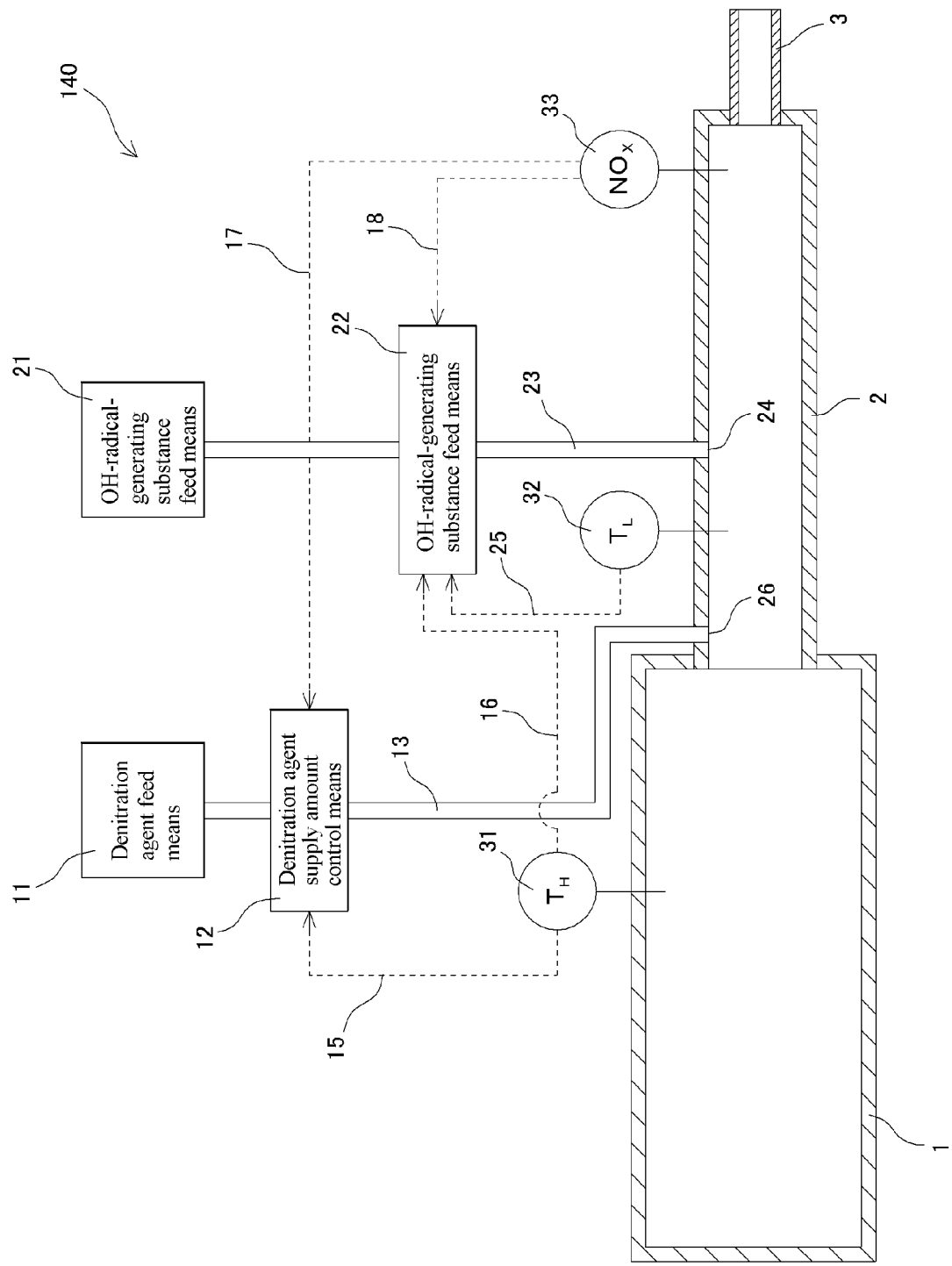
FIG. 6 is a block diagram schematically showing the structure of a denitration device 140 of a fourth embodiment.

FIG. 6 is a block diagram schematically showing the structure of a denitration device 140 according to the fourth embodiment of the present invention. In the denitration device 140 of the present embodiment, a denitration agent blowing port 26 for feeding a denitration agent from a denitration agent feed means 11 is provided in an exhaust pipe 2. The denitration agent blowing port 26 is formed in the exhaust pipe 2 near the position communicating with a combustion chamber 1, and upstream of an OH-radical-generating substance blowing port 24. The other components are the same as those in the first embodiment and they are indicated with the same numerals, and explanations thereof are omitted.

In the present embodiment, the denitration agent is fed to the high temperature exhaust gas immediately after flowing into the exhaust pipe 2 from the combustion chamber 1. The temperature of the exhaust gas is controlled in the combustion chamber 1, and the temperature of the exhaust gas in the exhaust pipe 2 when the denitration agent is fed is preferably kept at 800° C. or higher. The exhaust gas to which the denitration agent is fed is cooled during moving through the exhaust pipe 2, and its temperature is preferably kept at 500° C. or higher and 800° C. or lower near the OH-radical-generating substance blowing port 24.

Fifth Embodiment

Figure 7:
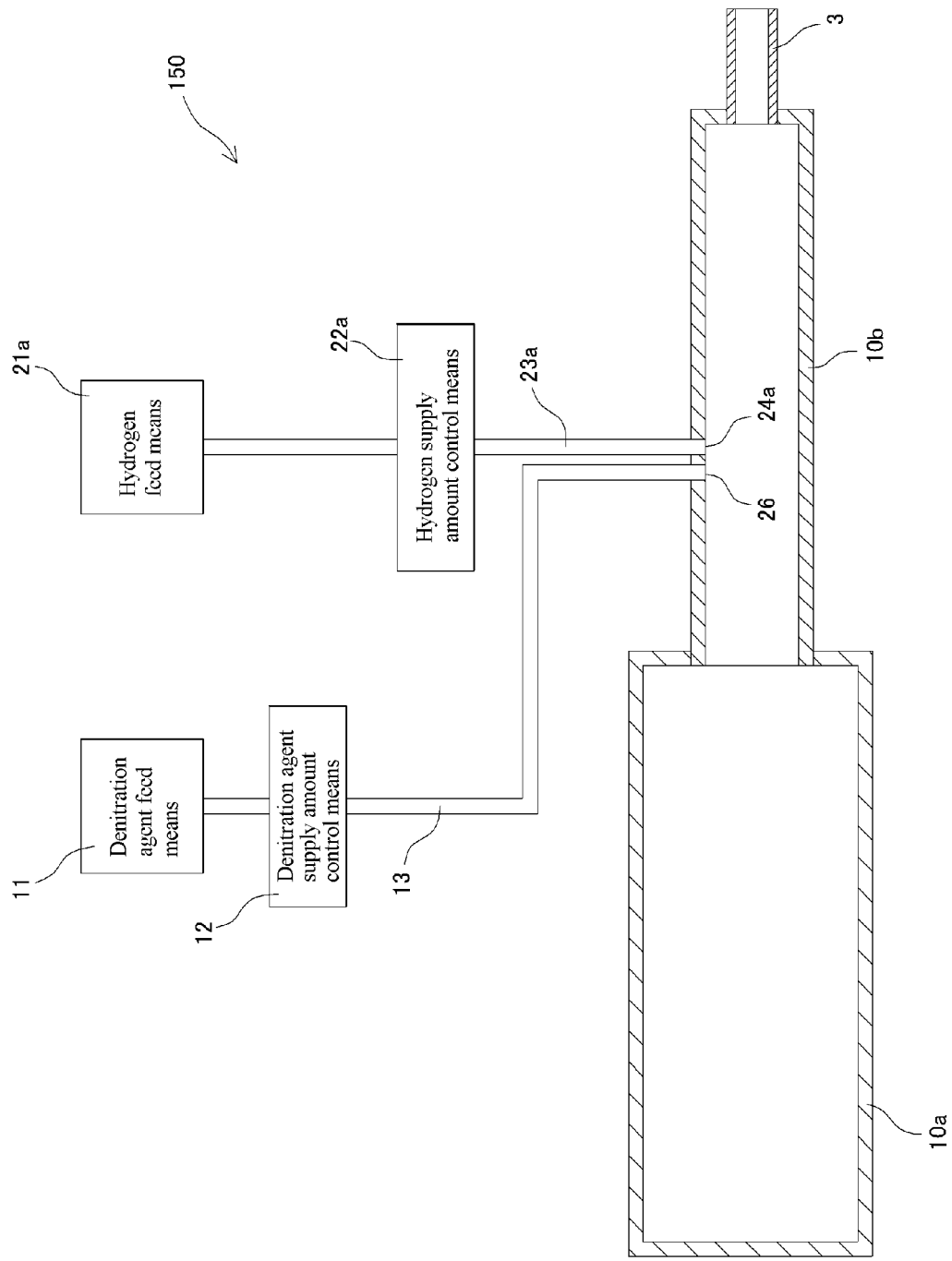
FIG. 7 is a block diagram schematically showing the structure of a denitration device 150 of a fifth embodiment.

FIG. 7 shows a denitration device 150 according to the fifth embodiment. In the denitration device 150, a hydrogen blowing port 24a, and a denitration agent blowing port 26 adjacent thereto are formed in an exhaust pipe 10b. The denitration agent fed from a denitration agent feed means 11 passes through a denitration agent feed channel 13, and is fed from the denitration agent blowing port 26 into the exhaust pipe 10b. The hydrogen blowing port 24a and denitration agent blowing port 26 are adjacent to each other, so that the denitration agent and hydrogen are fed to almost the same position in the exhaust pipe. The temperature of the exhaust gas to which the denitration agent and hydrogen are fed to is 800° C. or lower, and is controlled in such a manner that a temperature of 500° C. or higher is maintained. The other components of the denitration device 150 are the same as those in the second embodiment, and they are indicated with the same numerals, and explanations thereof are omitted.

In the following example of the denitration method using the denitration device 150, the denitration method carried out by the denitration device 150 may be referred to as "low temperature denitration method". The low temperature denitration method is characterized in that a denitration agent and hydrogen are fed almost simultaneously to exhaust gas at 500° C. or higher and 800° C. or lower, thereby promoting denitration reaction.

Other Embodiment

Figure 5:
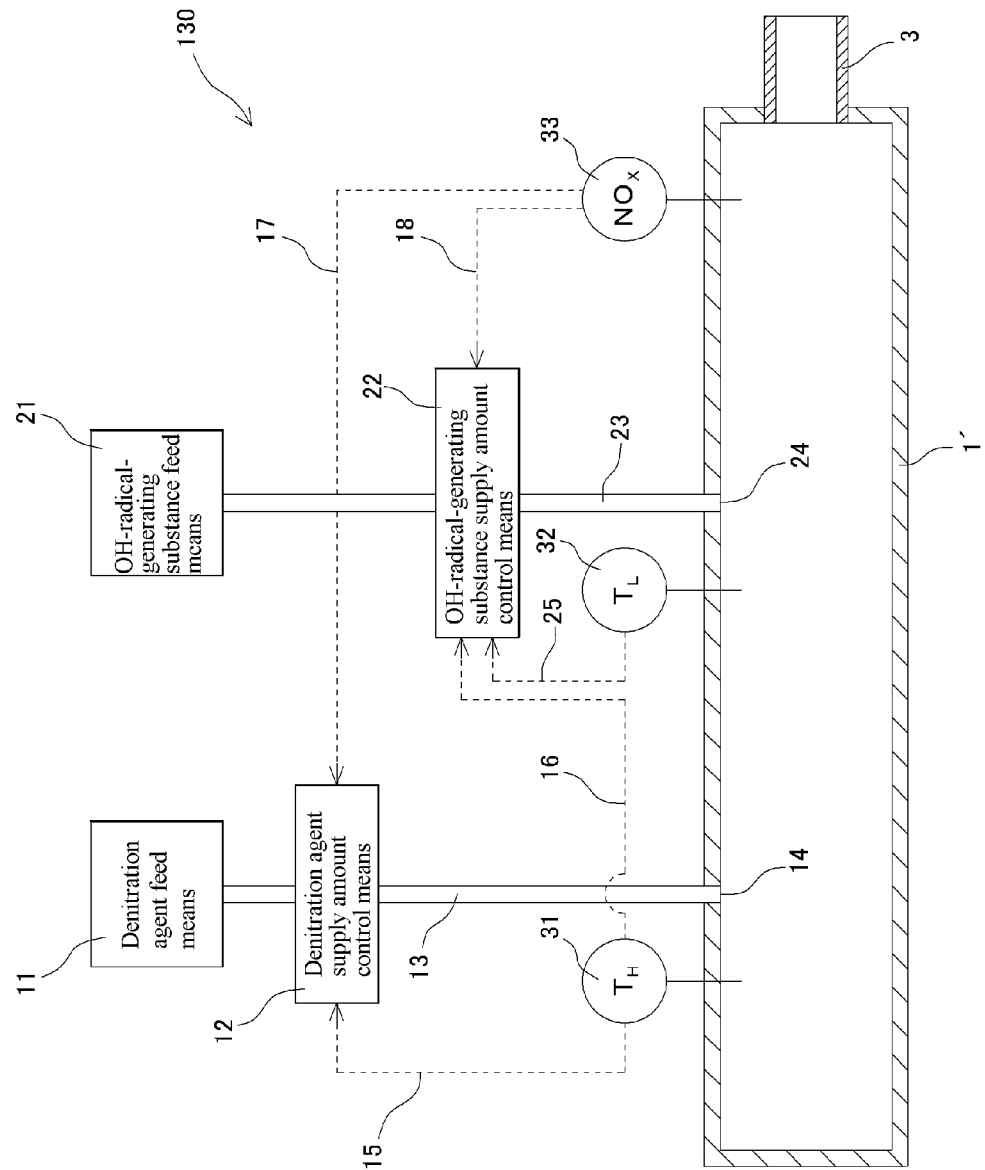
FIG. 5 is a block diagram schematically showing the structure of a denitration device 130 of a modification example.

A modification of the denitration device of the present invention including partially modified components is described below. FIG. 5 schematically shows the structure of a denitration device 130 of a modification example including a combustion chamber 1' which integrates an exhaust pipe and a combustion chamber. The combustion chamber 1' is formed in such a manner that the vertical or horizontal side is longer than the other side, and an exhaust port 3 for discharging exhaust gas is formed at one end in the longitudinal direction. Burning is carried out at the other end opposite to the exhaust port, and the generated exhaust gas flows toward the exhaust port 3, A denitration agent blowing purl communicated with a denitration agent feed means 11 is provided upstream of the flow of the exhaust gas, and an OH-radical-generating substance blowing port communicated with an OH-radical-generating substance feed means is provided downstream of the flow of the exhaust gas.

In addition, the denitration device of the present invention includes heat exchangers in the exterior of the combustion chamber 1 and exhaust pipe 2, respectively and circulates a heat medium in these heat exchangers, thereby collecting exhaust heat from the combustion chamber 1 to feed the heat to the exhaust pipe 2, and preventing excessive temperature decrease of the exhaust pipe 2 to further improve the denitration rate.

EXAMPLES

Specific examples of denitration using the denitration device 110 and denitration device 150 according to the embodiments of the present invention are described below, with reference to drawings.

Example 1

Figure 8:
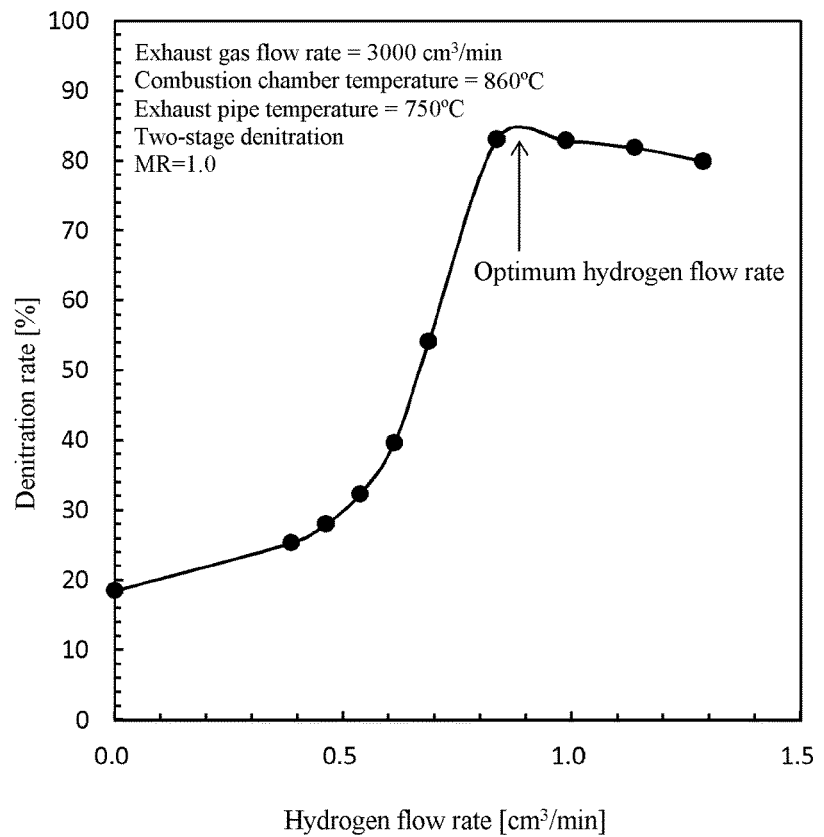
FIG. 8 is a graph showing the relationship between a hydrogen flow rate and a denitration rate in Example.

The denitration treatment of exhaust gas using the denitration device 110 of the second embodiment is described in detail with reference to FIGS. 8 to 10. FIG. 8 is a graph showing the result of the change of the denitration rate by the change of the supply amount of hydrogen gas when the flow rate of the exhaust gas was kept at 3000 cm$^3$/min and the molar ratio of nitric monoxide in the ammonia and exhaust gas (hereinafter may be referred to as $NH_3$/NO molar ratio, or simply MR) fed in the first denitration reaction step was adjusted to 1.0 by controlling the burning conditions so as TO make the temperature of the exhaust gas in the combustion chamber 1 860° C., and the temperature of the exhaust gas in the exhaust pipe 2 750° C. With the increase of the hydrogen flow rate, the denitration rate rapidly increased, reached the maximum value, and then slowly decreased. Under the conditions in FIG. 8, the denitration rate was the highest when the hydrogen flow rate was 0.85 cm$^3$/min, and this hydrogen flow rate was found to be the optimum condition.

As a result of various validations, it was found that the cause of the decrease of the denitration rate by excessive increase of the hydrogen flow rate is that the excessively generated OH generates an NH radical by the reaction shown in Formula 10, and the NH radical reacts with oxygen in the exhaust gas to re-generate nitric monoxide by the reaction represented by Formula 11.

$$NH_2+OH \rightarrow NH+H_2O \qquad \text{(Formula 10)}$$

$$NH+O_2 \rightarrow NO+OH \qquad \text{(Formula 11)}$$

As a result of study based on the above-described findings, it was found that for the achievement of the maximum denitration rate, it is required to measure the combustion chamber temperature $T_H$ and the exhaust pipe temperature $T_L$, and determine the hydrogen flow rate fed in the second denitration reaction step based on the temperature environment. In addition, the optimum hydrogen flow rate also depends on the nitric monoxide flow rate in the exhaust gas, so that it is necessary to measure the nitric monoxide concentration in the exhaust gas in the vicinity of the exhaust port 3, determine the nitric monoxide flow rate from the calculated exhaust gas flow rate, and reflect this flow rate on the hydrogen feed amount. The flow rate of the ammonia fed in the first denitration reaction step is easily established based on the combustion chamber temperature $T_H$ and nitric monoxide flow rate in the exhaust gas.

Figure 9:
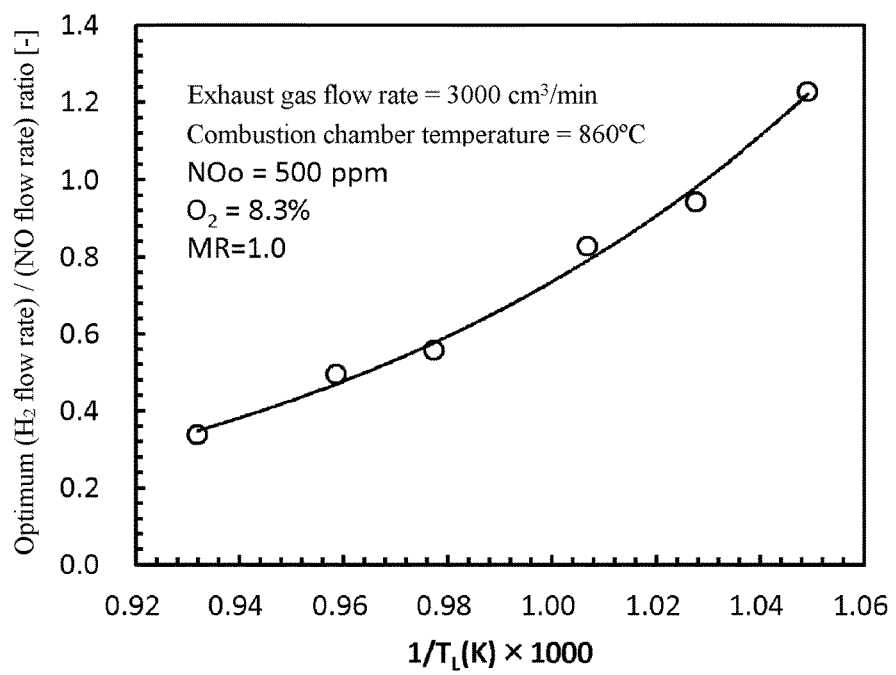
FIG. 9 is a graph showing the optimum $H_2$/NO flow rate ratio with respect to the gas temperature in the exhaust pipe in Example.

FIG. 9 shows the measurement of the optimum hydrogen flow rate for achieving the maximum denitration rate when the burning conditions were controlled using the denitration device 110 so as to make the combustion chamber temperature 860° C., the first denitration reaction step was adjusted to MR=1.0, and the gas temperature in the exhaust pipe 2 was changed. FIG. 9 shows the value of the optimum $H_2$ flow rate/NO flow rate with respect to the value of $1/T_L \times 1000$ (abscissa) when the gas temperature $T_L$ in the exhaust pipe 2 was experimentally changed from 953 K to 1073 K (from 680° C. to 800° C.).

The validation result shown in FIG. 9 indicates that the optimum $H_2$ flow rate/NO flow rate ratio is derived by the following formula when the combustion chamber temperature is 860° C.

$$\text{(Optimum } H_2 \text{ flow rate/NO flow rate ratio)} = a \times (1/T_L \times 1000)^b \qquad \text{(Formula 12)}$$

In the formula, a and b are constants.

Figure 10:
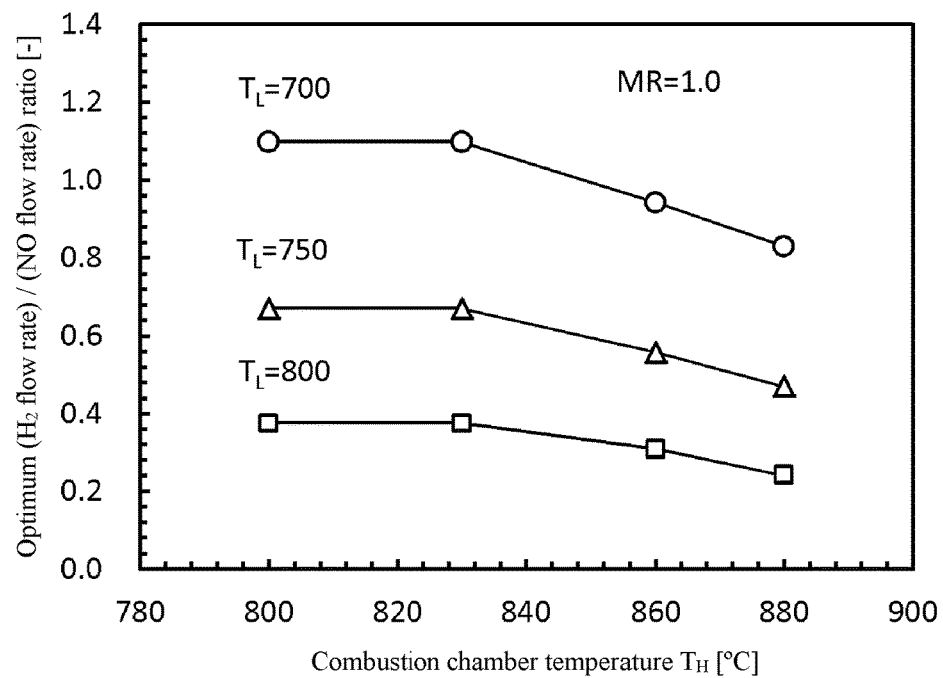
FIG. 10 is a graph showing the optimum $H_2$/NO flow rate ratio when the combustion chamber temperature and the gas temperature in the exhaust pipe were changed in Example.

Furthermore, FIG. 10 shows the result of the experimental validation of the optimum $H_2$ flow rate determined by changing both of the combustion chamber temperature and gas temperature in the exhaust pipe. FIG. 10 summarizes the measurement results of the optimum ratio of the $H_2$ flow rate/NO flow rate with respect to the combustion chamber temperature $T_H$ (° C.), when the gas temperature $T_L$ in the exhaust pipe was changed at three levels; 700° C., 750° C., and 800° C. The MR of the first denitration reaction step was fixed at 1.0. As a result of the validation shown in FIG. 10, it was found that the higher the combustion chamber temperature and the higher gas temperature in the exhaust pipe, the lower the optimum ratio of the $H_2$ flow rate/NO flow rate, and the lower the optimum $H_2$ flow rate. In addition, it was found that the result of the measurement shown in FIG. 10 can be formulated by expressing the constant a in Formula 12 as the function of $T_H$ and $T_L$. More specifically, it can be formulated as follows:

$$a = f(T_H, T_L) \quad \text{(Formula 13)}$$

In more detail, the constant a satisfies the relationship:

$$a = -c \times T_H + d \quad \text{(Formula 14)}$$

In the formula, $$c = e \times T_L \quad \text{(Formula 15)}$$

(e is a constant).

Furthermore, when $T_H \leq 830°$ C., the constant a can be expressed by the function of $T_L$:

$$a = f \times T_L \quad \text{(Formula 16)}.$$

As shown in FIG. 10, when the combustion chamber temperature $T_H$ is 830° C. or lower, the optimum $H_2$/NO with respect to the combustion chamber temperature $T_H$ is constant, and the value of the constant a can be determined by $T_L$ alone.

(Comparison of Denitration Rate Between Prior Art and Example)

Figure 11:
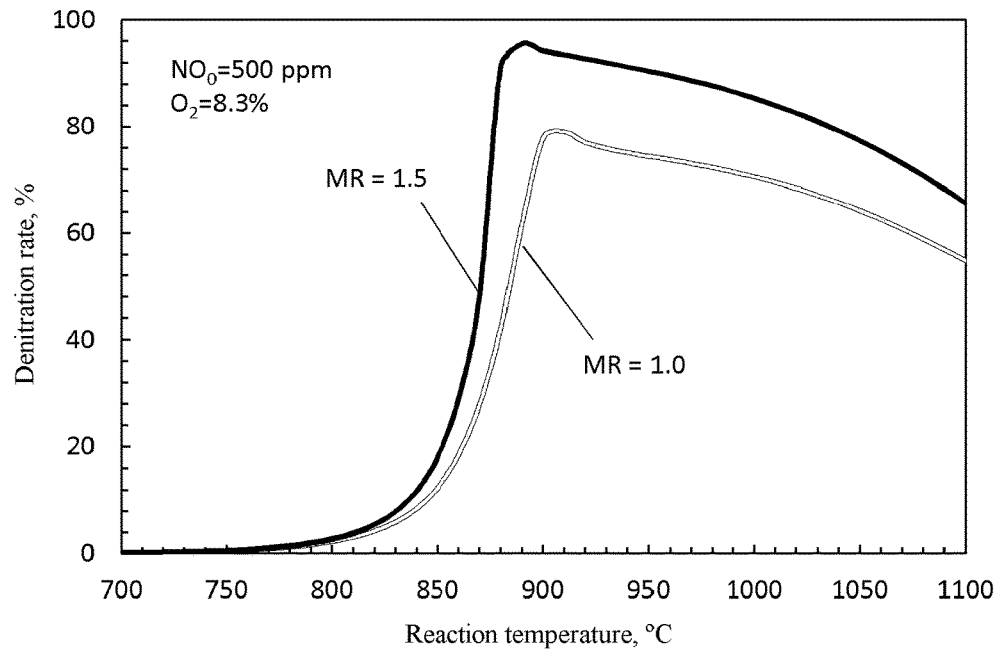
FIG. 11 is a graph showing the relationship between the denitration rate and reaction temperature by prior art non-catalytic denitration method.

The prior art herein means the non-catalytic denitration method disclosed in Patent Literature 1 in CITATION LIST, which is a denitration method including injecting ammonia or ammonia generated from a substance generating ammonia (for example, urea) into a combustion chamber at a high temperature. FIG. 11 shows the result of the validation of the relationship between the denitration rate and reaction temperature by a prior art non-catalytic denitration method.

Figure 12:
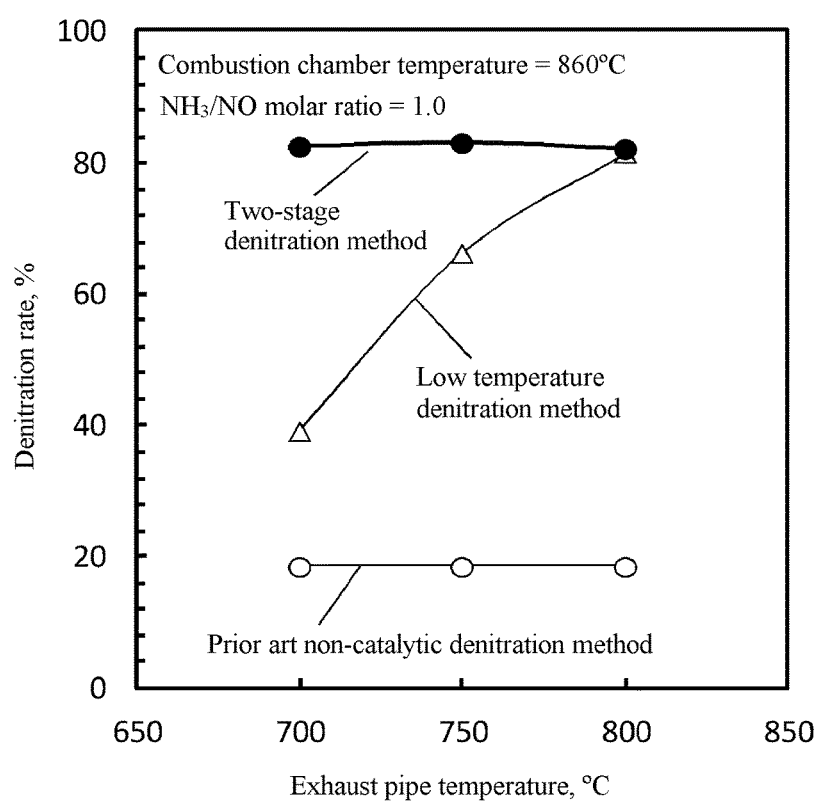
FIG. 12 shows the comparison of the denitration properties between the denitration devices of prior art example and Example.

FIG. 12 is a graph showing the comparison of the denitration rate between prior art and examples of denitration according to the present invention using the denitration device 110 and denitration device 150. In this graph, the denitration method using the denitration device 110 is indicated with "two-stage denitration method". In addition, the denitration method using the denitration device 150 is indicated with "low temperature denitration method". In this comparison, the temperature in the combustion chamber is adjusted to 860° C., and the $NH_3$/NO molar ratio fed to the combustion chamber is standardized at 1.0. Furthermore, the temperature in the exhaust pipe is changed at three levels, or 700° C., 750° C., and 800° C., and the hydrogen flow rate in Example was adjusted to the optimum $H_2$ flow rate calculated by Formula 12, and the experiment was carried out. The list of the denitration rates measured in the experiment is shown in Table 1.

TABLE 1

| Gas temperature in exhaust pipe $T_L$ ° C. | Hydrogen flow rate cm³/min | Prior art denitration rate | Denitration rate by low temperature denitration method % | Denitration rate by two-stage denitration method % |
|---|---|---|---|---|
| 700 | 1.41 | 18.5 | 39.2 | 82.6 |
| 750 | 0.84 | 18.5 | 66.3 | 83.1 |
| 800 | 0.51 | 18.5 | 81.6 | 82.2 |

As shown in FIG. 12 and corresponding Table 1, the denitration rate by the two-stage denitration method using the denitration device 110 was higher than the denitration rate by prior art and the low temperature denitration method using the denitration device 150 in either cases when the gas temperature in the exhaust pipe was 700° C., 750° C., and 800° C., indicating that denitration was stably carried out at a high level. On the other hand, under the low temperature denitration method using the denitration device 150, the gas temperature in the exhaust pipe was kept high, indicating that a denitration rate equivalent to that achieved by the two-stage denitration method is achieved when a denitration agent and hydrogen are fed to the exhaust gas at a high temperature.

Table 2 shows the result of the comparison between prior art and the two-stage denitration method wherein an optimum hydrogen flow rate was provided, with the combustion chamber temperature kept at $T_H = 860°$ C., and the temperature conditions in the exhaust pipe change at six levels from 680° C. to 800° C. In the same manner as in the above-described result, the non-catalytic denitration device and non-catalytic denitration method in the present example was found to markedly improve the denitration rate in comparison with the prior art non-catalytic denitration method.

TABLE 2

| Gas temperature in exhaust pipe $T_L$ ° C. | Hydrogen flow rate cm³/min | Prior art denitration rate % | Denitration rate by two-stage denitration method % |
|---|---|---|---|
| 680 | 1.84 | 18.5 | 82.1 |
| 700 | 1.41 | 18.5 | 82.6 |
| 720 | 1.24 | 18.5 | 83.0 |
| 750 | 0.84 | 18.5 | 83.0 |
| 770 | 0.74 | 18.5 | 83.1 |
| 800 | 0.51 | 18.5 | 82.2 |

The non-catalytic denitration device and non-catalytic denitration method explained in the present example may be modified as appropriate. For example, the constitutions of the temperature measurement means, and the concentration measurement means for nitrogen oxides composition may be replaced with other measurement instruments. In addition, the means for controlling the supply amounts of the denitration agent and OH-radical-generating substance may be changed as appropriate according to the feed means for the denitration agent and OH-radical-generating substance. The shape of the combustion chamber and exhaust pipe, joining method, and the position of the exhaust port may be changed as appropriate according to the arrangement and function of the non-catalytic denitration device and the whole instrument operating the non-catalytic denitration method.

INDUSTRIAL APPLICABILITY

The non-catalytic denitration device and non-catalytic denitration method according to the present invention are applicable to, for example, incinerators, combustion furnaces, and internal combustion engines.

REFERENCE SIGNS LIST 1, 1', 10a combustion chamber
2, 10b exhaust pipe
3 exhaust port
100, 110, 120, 130, 140, 150 denitration device
11 denitration agent feed means
12 denitration agent supply amount control means
13 denitration agent feed channel
14, 26 denitration agent blowing port
15, 16, 17, 18, 25 communication line
20 hydrogen raw material feed channel
21 OH-radical-generating substance feed means
21a hydrogen feed means
22 OH-radical-generating substance supply amount control means
22a hydrogen supply amount control means
23 OH-radical-generating substance feed channel
23a hydrogen feed channel
24 OH-radical-generating substance blowing port
24a hydrogen blowing port
31, 32 temperature measurement means
33 NOx concentration measurement means
202 high voltage power source
203 plasma reactor
204 discharge space
205 high voltage electrode
206 inner chamber
207 grounding electrode
211 hydrogen channel
212 hydrogen separation membrane
213 support
214 O-ring
[FIG. 1]
11/Denitration agent feed means
12/Denitration agent supply amount control means
21/OH-radical-generating substance feed means
22/OH-radical-generating substance supply amount control means
[FIG. 2]
21a/Hydrogen feed means
22a/Hydrogen supply amount control means
[FIG. 8]
1/Denitration rate [%]
2/Hydrogen flow rate [cm$^3$/min]
3/Exhaust gas flow rate=3000 cm$^3$/min
Combustion chamber temperature=860° C.
Exhaust pipe temperature=750° C.
Two-stage denitration
4/Optimum hydrogen flow rate
[FIG. 9]
5/Optimum (H$_2$ flow rate)/(NO flow rate) ratio [–]
[FIG. 10]
1/Optimum (H$_2$ flow rate)/(NO flow rate) ratio [–]
2/Combustion chamber temperature T$_H$ [° C.]
[FIG. 11]
3/Denitration rate, %
4/Reaction temperature, ° C.
[FIG. 12]
1/NH$_3$/NO molar ratio=1.0
2/Two-stage denitration method
3/Low temperature denitration method
4/Prior art non-catalytic denitration method
5/Exhaust pipe temperature, ° C.

The invention claimed is:

1. A non-catalytic denitration device for removing nitrogen oxides in exhaust gas, comprising:
a combustion chamber for denitrating exhaust gas generated in the combustion chamber, the exhaust gas containing oxygen;
an exhaust pipe provided between the combustion chamber and an exhaust port;
a denitration agent feed means for feeding a denitration agent to the combustion chamber; and
an OH-radical-generating substance feed means for feeding an OH-radical-generating substance to the exhaust pipe,
wherein the denitration agent feed means feeds a denitration agent to exhaust gas at 800° C. or higher in the combustion chamber,
the OH-radical-generating substance feed means feeds an OH-radical-generating substance to exhaust gas at 500° C. or higher and 800° C. or lower in the exhaust pipe,
the OH-radical-generating substance feed means comprises a hydrogen feed means and a hydrogen feed amount control means and feeds hydrogen as an OH-radical-generating substance to the exhaust pipe, and
the hydrogen feed amount control means controls the hydrogen feed amount based on the temperature of the combustion chamber, the temperature of the exhaust pipe, and the concentration of nitrogen oxides contained in the exhaust gas discharged from the exhaust port; and wherein:
a first temperature measurement means is provided in the combustion chamber,
a second temperature measurement means is provided in the exhaust port,
a nitrogen oxides concentration measurement means is provided in the vicinity of the exhaust port of the exhaust pipe, and
the hydrogen feed amount control means determining the hydrogen feed amount based on the temperature of the combustion chamber measured by the first temperature measurement means, the temperature of the exhaust pipe measured by the second temperature measurement means, and the concentration of nitrogen oxides in exhaust gas measured by the nitrogen oxide concentration measurement means.

2. The non-catalytic denitration device of claim 1, wherein the denitration agent feed means is a means for feeding ammonia or urea as a denitration agent, and
the hydrogen feed means is a means for generating hydrogen from ammonia or urea fed from the denitration agent feed means, and wherein: the hydrogen feed means comprises a plasma reactor, a high voltage electrode connected to a high voltage power source in a state placed inside of the plasma reactor, and a grounding electrode placed outside the plasma reactor so as to oppose the high voltage electrode,
discharge occurs between the high voltage electrode and grounding electrode by the electric power fed from the high voltage power source when the ammonia- or urea-containing gas fed from the denitration agent feed means is introduced to the plasma reactor, to turn the ammonia or urea contained in the gas to plasma thereby generating hydrogen, and the generated hydrogen is introduced to the exhaust pipe.

3. A non-catalytic denitration device for removing nitrogen oxides in exhaust gas, comprising:

a combustion chamber for denitrating exhaust gas generated in the combustion chamber, the exhaust gas containing oxygen;

an exhaust pipe provided between the combustion chamber and an exhaust port;

a denitration agent feed means for feeding a denitration agent to the combustion chamber; and an OH-radical-generating substance feed means for feeding an OH-radical-generating substance to the exhaust pipe, wherein the denitration agent feed means feeds a denitration agent to exhaust gas at 800° C. or higher in the combustion chamber, the OH-radical-generating substance feed means feeds an OH-radical-generating substance to exhaust gas at 500° C. or higher and 800° C. or lower in the exhaust pipe, the OH-radical-generating substance feed means comprises a hydrogen feed means and a hydrogen feed amount control means and feeds hydrogen as an OH-radical-generating substance to the exhaust pipe, and the hydrogen feed amount control means controls the hydrogen feed amount based on the temperature of the combustion chamber, the temperature of the exhaust pipe, and the concentration of nitrogen oxides contained in the exhaust gas discharged from the exhaust port;

wherein the denitration agent feed means is a means for feeding ammonia or urea as a denitration agent, and the hydrogen feed means is a means for generating hydrogen from ammonia or urea fed from the denitration agent feed means; and the hydrogen feed means comprises a plasma reactor, a high voltage electrode connected to a high voltage power source in a state placed inside of the plasma reactor, and a grounding electrode placed outside the plasma reactor so as to oppose the high voltage electrode, and discharge occurs between the high voltage electrode and grounding electrode by the electric power fed from the high voltage power source when the ammonia- or urea-containing gas fed from the denitration agent feed means is introduced to the plasma reactor, to turn the ammonia or urea contained in the gas to plasma thereby generating hydrogen, and the generated hydrogen is introduced to the exhaust pipe.

4. A non-catalytic denitration method for removing nitrogen oxides in exhaust gas which contains oxygen, comprising:

a first denitration reaction step for carrying out first denitration reaction by feeding a denitration agent to exhaust gas in a combustion chamber at 800° C. or higher; and a second denitration reaction step for carrying out second denitration reaction by feeding an OH-radical-generating substance to exhaust gas in an exhaust pipe located between the combustion chamber and an exhaust port, the exhaust gas being at 500° C. or higher and 800° C. or lower after the first denitration reaction, wherein the OH-radical-generating substance is hydrogen, and wherein:

a first temperature measurement means is provided in the combustion chamber, a second temperature measurement means is provided in the exhaust port, a nitrogen oxides concentration measurement means is provided in the vicinity of the exhaust port of the exhaust pipe, and the hydrogen supply amount is controlled based on the temperature of the combustion chamber measured by the first temperature measurement means, the temperature of the exhaust pipe measured by the second temperature measurement means, and the concentration of nitrogen oxides in exhaust gas measured by the nitrogen oxide concentration measurement means.

\* \* \* \* \*